Feb. 23, 1971   J. E. P. SJÖHOLM   3,565,472
SCREW THREADED ASSEMBLIES
Filed Jan. 21, 1969   3 Sheets-Sheet 1

INVENTOR.
Johan Erik Patrik Sjöholm
BY

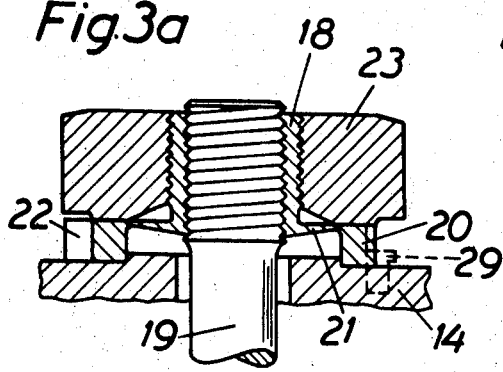
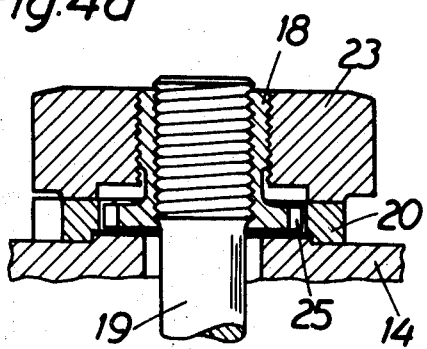
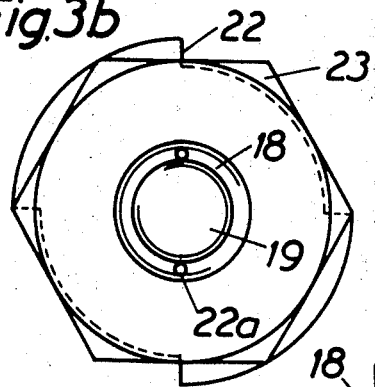
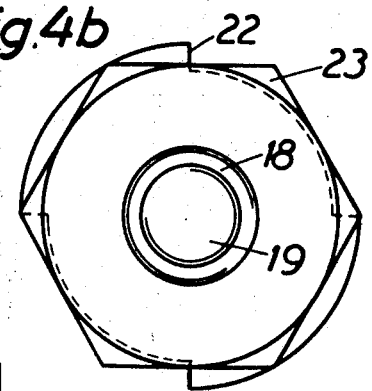
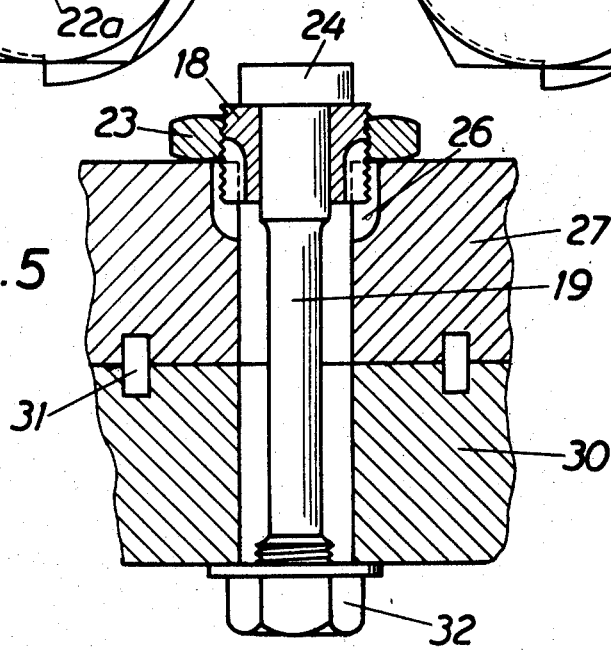

United States Patent Office 3,565,472
Patented Feb. 23, 1971

3,565,472
SCREW THREADED ASSEMBLIES
Johan Erik Patrik Sjöholm, Lund, Sweden, assignor to Atlas Copco Aktiebolag, Nacka, Sweden, a corporation of Sweden
Filed Jan. 21, 1969, Ser. No. 792,666
Claims priority, application Sweden, Jan. 19, 1968, 698/68
Int. Cl. F16d 1/06
U.S. Cl. 287—53                                                  15 Claims

ABSTRACT OF THE DISCLOSURE

An elongated member, e.g., a strain bolt, is arranged to hold two parts together, e.g., a gear to a rotor. A sleeve is carried by the bolt and a nut is threaded on the sleeve to clamp a washer between the nut and one of the parts, the washer and the sleeve being so connected that axial movement but no turning movement can occur between them. This arrangement permits tensioning of the bolt without simultaneous creation of torque in the bolt if means is provided for preventing turning of the washer during the tightening operation of the nut.

---

This invention relates to screw threaded assemblies of the type having an elongated member, which is loaded by tension and arranged to hold two parts together. In connection with previous embodiments of such screw threaded assemblies a torque applied to the nut creates not only the desired tension load but also a torque load in the elongated member.

It is an object of the invention to permit applying of tension load to an elongated member in a screw threaded assembly of the above-mentioned type without simultaneously creating a torsional stress in the member.

For this and other purposes I provide a screw threaded assembly comprising a first part, a second part adapted to be fixed to said first part, an elongated member affixed to said first part with an end, a sleeve member carried by an opposite end of the elongated member and arranged to transmit a force to the elongated member which creates tension therein, means for locking said sleeve member against turning relative to said second part, and a nut in screw threaded engagement with the sleeve for creating said tension in the elongated member.

The above and other objects of the invention are obvious from the following description and the accompanying drawings in which three embodiments of the invention are illustrated by way of example. It should be understood, however, that these embodiments are only illustrative of the invention and that various modifications may be made within the scope of the claims.

Figure 1:
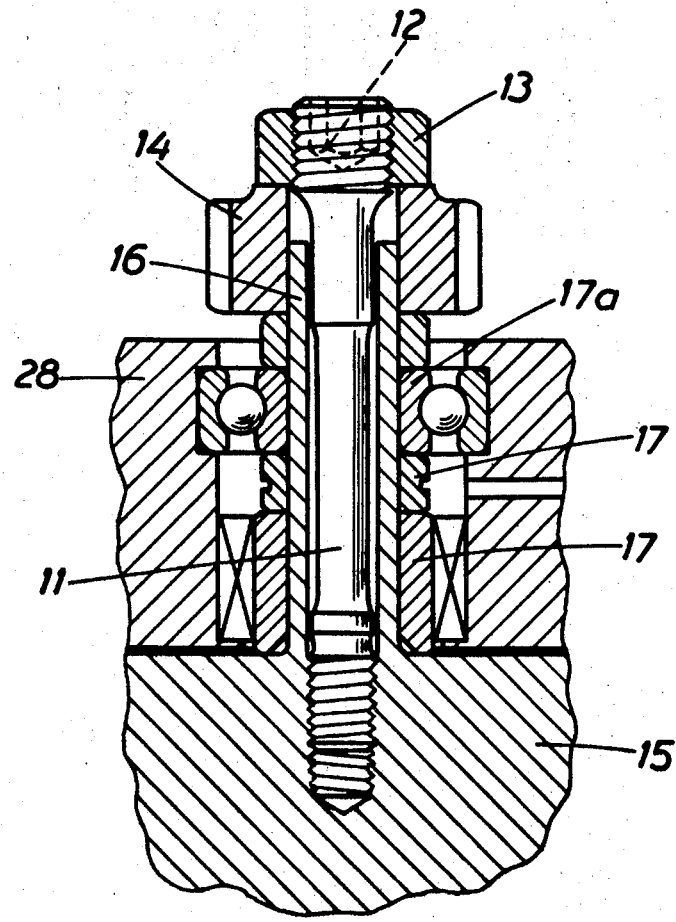
Figure 2:
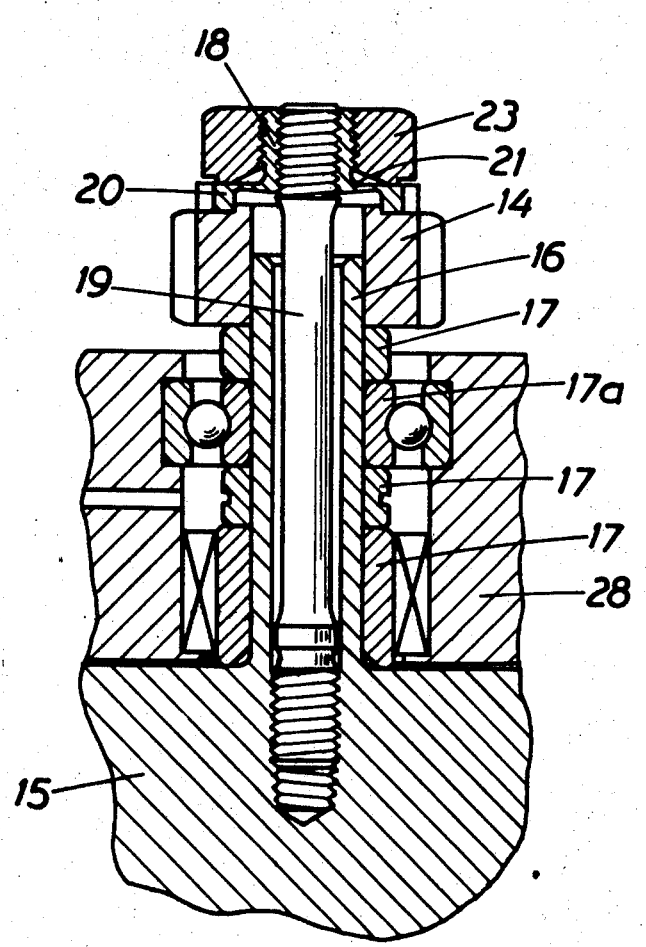

FIG. 1 is a longitudinal axial section of a screw threaded assembly according to the prior art. FIG. 2 is a longitudinal section of a screw threaded assembly according to the invention. FIG. 3 is a section on a larger scale of the upper part of the assembly in FIG. 2 and FIG. 3b is a top view of the assembly in FIG. 3a. FIG. 4a is an axial section of a part of another assembly according to the invention and FIG. 4b is a top view of the assembly in FIG. 4a. FIG. 5 is a longitudinal axial section of a third assembly according to the invention. In the various figures the same reference numerals have been used to indicate equivalent parts.

In order to better illustrate the advantages of screw-threaded assemblies according to the invention FIG. 1 shows a simplified screw threaded assembly according to the prior art with a strain bolt 11 and a nut 13 for fastening a synchronizing gear 14 to a rotor 15, e.g., a rotor of a screw rotor compressor. The bolt 11 is screwed into the rotor 15 and a bearing 17a, spacers 17 and the gear 14 are slipped on a stub shaft 16 of the rotor 15 before the nut 13 is screwed on. The bearing 17a is carried by a housing 28. Now, when the nut 13 is to be turned to the desired appropriate torque, a counter holding tool in the form of a hexagonal key is inserted in a hexagonal recess 12 in the head of the bolt. When the counter holding tool has been inserted in the recess 12 the bolt is held fixed while the nut 13 is turned by a suitable wrench. A part of the torque applied to the nut is then transferred by the mating threads of the nut and bolt and taken up in the head of the bolt without creating torsional stress in the shank of the bolt. However, by friction between the nut and the gear 14, another part of the torque applied to the nut 13 is transferred to the rotor 15 via the gear 14. The rotor 15 is rotatively journalled and, consequently, cannot take up any torque. Therefore, this part of the torque is transferred to the bolt by the mating threads of the rotor and the bolt and up through the shank of the bolt until it is taken up by the counter holding tool in the bolt head. When the compressor is running, the torque applied to the bolt by the gear 14 may be of the same magnitude as the maximum frictional torque between the gear 14 and the spacers 17 but of opposite direction. Therefore, the gear may be displaced, i.e., turned relative to the rotor 15 and the bolt may thus be relieved of so much of the torque that the assembly will be able to take up the working torque.

FIGS. 2 and 3, a and b, illustrate an assembly used to mount a gear 14 to a rotor 15 in a similar way as the one shown in FIG. 1. The assembly includes a sleeve 18, which is in threaded engagement with a bolt 19. An annular web 21 connects the sleeve 18 to a washer 20 which may be a sleevelike washer. This washer has recesses 22 for engagement with a counter holding tool. The sleeve 18 is in threaded engagement with a nut 23.

During the mounting operation of the assembly, the bolt 19 is at first screwed into the rotor. A bearing 17a, spacers 17 and the gear 14 are then slipped onto the hollow stub shaft 16 of the rotor 15. The sleeve 18 with the washer 20 is then screwed on to the bolt until the washer contacts the gear 14 and the nut 23 is screwed on to the sleeve 18 until it contacts the washer 20. A counter holding tool then engages the washer 20 and a dynamometric wrench is engaged to turn the nut 23 to the appropriate torque. The result is that the sleeve 18 is lifted in relation to the washer 20 and the gear 14 and thus the web 21 is axially deformed. The web may be elastic, but is normally plastically deformed by the bending stress. The part 18, 20, 21 is therefore a consumption or throw away part, which sometimes has to be replaced after disassembling but which can usually be used a couple of times. Thus, the web 21 transfers friction torque from the mating threads of the sleeve 18 and the nut 23 via the washer 20 to the counter holding tool. Of course, instead of the washer, the sleeve 18 can be provided with recesses 22a for engagement with a counter holding tool as shown in FIG. 3b.

In order to get the web 21 as weak as possible, it is made with varying thickness so that the torsional stress is about the same in all parts of the web. If the threads of the nut are greased with molybdenum desulphide or the like, it is possible to make the web 21 thinner, since the torque transferred by the threads will be smaller. Due to the axial strength of the web there will be an additional axial force which, for instance, may be 5% of the total load on the bolt. If the contact surface between the washer 20 and the nut is also greased, the bolt tension becomes a more precise function of the applied torque, that is to say there is less risk of getting the wrong tension stress in the bolt.

Thus, it is possible to tighten the nut 23 without transferring friction torque from the nut and via the threads of the nut or via the washer 20 to the bolt 19. The bolt will therefore not tend to turn the synchronizing gear 14 relative to the rotor. Moreover, the bolt can be axially prestressed more, e.g., 50% more, than what is possible with a conventional assembly. Sometimes, the washer 20 may be fastened to one of the parts being united by the screw threaded assembly. For this purpose a key or pin 29, shown in FIG. 3a by dash lines, may be provided.

FIGS. 4a and b show another embodiment of the invention, which is more suitable for long bolts because it can be made to permit longer axial movement. The washer 20 and sleeve 18 are here separate parts united by mating splines 25. These mating splines are preferably press fitted in order to avoid any peripheral play and are greased with molybdenum disulphide or the like. Tightening of the nut 23 results in an axial movement between the mating splines due to the elongation of the bolt. If the washer is held by a counterholding tool during the slacking operation of the nut, the bolt will withdraw the sleeve almost to its initial position relative to the washer. Accordingly, a device of this type may be used several times.

The sleeve 18 can be engaged to the bolt 19 by other means than threads. For example, it may be held by a bolt head 24 as shown in FIG. 5, which illustrates an embodiment in which the bolt 19 holds two parts 27, 30 together. Provided that these parts 27, 30 cannot be turned relative to each other, for instance by means of pins 31, the described washer 20 may be omitted and the sleeve 18 may be splined to the part 27 by splines 26 as shown. When the nut 23 is turned, the bolt head 24 must not be used for engagement with a counter holding tool. Reference numeral 32 refers to a nut, which must not be used for tightening the assembly.

In connection with screw threaded assemblies according to the invention a conventional dynamometric wrench and a conventional counter holding tool, e.g., a wrench, may be used if the bolt is screwed into a rotatable base of moderate mass, e.g., into a rotatively journalled rotor as described, since too great counter holding torque will only effect rotation of the rotor.

When, on the contrary, the base to which the bolt is affixed has a great moment of inertia or can be considered as static, the applied counter holding torque has to be equal to the torque applied to the nut to avoid torsional stress in the bolt.

This can be accomplished by a tool, which is connected between the nut and the washer and only acted upon by forces in planes through the longitudinal axis of the bolt or by torques having their respective axes perpendicular to a plane through the axis of the bolt. If the parts to be united by the screw threaded assembly can not be turned relative to each other by the torque applied to the nut, the washer may be fastened to one of the parts or it can be omitted as described. By these arrangements, the nut can be tightened without the usage of any specially arranged counter holding tool.

In the embodiment of the invention shown in FIG. 2, the main purpose of the stub shaft 16 is to guide the spacers 17, the bearing 17a and the gear 14 during assemblying. Axial thrust and bending stress, however, is taken up by the endwise clamped sleeve structure formed by the spacers, the bearing and the gear. Besides pertaining to a screw-threaded assembly, the invention pertains also to a rotor assembly and to a sleeve and washer unit. The screw threaded assembly, the rotor assembly and the sleeve and washer unit above described and illustrated in the drawings should only be considered as examples and may be modified in several different ways within the scope of the following claims.

What is claimed is:

1. A screw-threaded assembly comprising a first part, a second part adapted to be fixed with respect to said first part, an elongated member affixed to said first part with an end, a sleeve member carried by an opposite end of the elongated member and arranged to transmit a force to the elongated member which creates tension therein, means for locking said sleeve member against turning relatively to the second part but permitting axial movement therebetween, and a nut in screw-threaded engagement with the sleeve for creating said tension in the elongated member.

2. A screw-threaded assembly according to claim 1 in which the second part is a washer and a third part is clamped between said washer and the first part.

3. A screw-threaded assembly according to claim 2 in which the washer is provided with means for engagement with a counter holding tool when the nut is tightened.

4. A screw-threaded assembly according to claim 2 in which the sleeve member is provided with means for engagement with a counter holding tool when the nut is tightened.

5. A screw-threaded assembly according to claim 2 in which the means for locking the washer to the sleeve member consists of mating splines on the sleeve member and the washer.

6. A screw-threaded assembly according to claim 5 in which said mating splines register by with a press fit.

7. A screw-threaded assembly according to claim 2 in which the sleeve member is in threaded engagement with the elongated member.

8. A screw-threaded assembly according to claim 2 in which the elongated member is a strain bolt.

9. A screw-threaded assembly according to claim 7 in which said sleeve structure of which the wheel is an integral part further comprises an antifriction bearing for journalling the rotor.

10. A screw-threaded assembly according to claim 2 in which the means for locking the washer to the sleeve member consists of a deformable web by which the sleeve is united to the washer, said web being axially deformable so as to permit said axial movement between the sleeve and the washer.

11. A screw-threaded assembly according to claim 2, in which the first part is a rotor having a hollow stub shaft and the third part is a sleeve structure around the hollow stub shaft, a wheel forming an integral part of the sleeve structure, the elongated member being a strain bolt extending through the hollow stub shaft and the sleeve structure.

12. A rotor assembly comprising a rotor, a hollow stub shaft on said rotor, a strain bolt extending through said hollow stub shaft and having a first end affixed to the rotor, a sleeve-like structure around the stub shaft which includes a wheel and has an end supported by the rotor and an outer end, a washer at said outer end, a first sleeve carried by a second end of said bolt, means providing axial movability between the washer and said sleeve but preventing turning between them, and a nut in threaded engagement with the sleeve for clamping the washer and the sleeve to the rotor.

13. A rotor assembly according to claim 12 in which said sleeve-like structure further comprises a roller bearing for journalling the rotor in a housing.

14. A rotor assembly comprising a rotor, a hollow stub shaft on said rotor, a strain bolt extending through said hollow stub shaft and having a first end affixed to the rotor, a structure around the stub shaft which includes a wheel member and has an end supported by the rotor and an outer end, a washer at said outer end, a sleeve carried by a second end of said bolt, means providing axial movability between said washer and the sleeve but preventing turning between them, and a nut in threaded engagement with the sleeve for clamping the washer and the sleeve to the rotor.

15. A rotor assembly according to claim 14 in which said structure further comprises a roller bearing for journalling the rotor in a housing.

References Cited

UNITED STATES PATENTS

| | | | |
|---|---|---|---|
| 2,577,134 | 12/1951 | Land | 287—53X |
| 2,602,683 | 7/1952 | Aue | 287—53 |
| 2,730,387 | 1/1956 | White | 287—53 |
| 2,883,012 | 4/1959 | Hoffman | 287—189.36F |
| 3,179,144 | 4/1965 | Brown | 151—41.73 |
| 3,259,163 | 7/1966 | Rosan et al. | 151—41.73 |
| 3,478,542 | 11/1969 | Dinger et al. | 287—53X |

DAVID J. WILLIAMOWSKY, Primary Examiner

A. V. KUNDRAT, Assistant Examiner

U.S. Cl. X.R.

74—548